United States Patent Office 3,380,924
Patented Apr. 30, 1968

3,380,924
SURFACE-ACTIVE PRODUCTS
Bruno Werdelmann, Haan, Rhineland, Karl-Heinz Worms, Dusseldorf, Germany, and Bruno Blaser, deceased, late of Dusseldorf-Urdenbach, Germany, by Ida Blaser, nee Bau, administratrix, Dusseldorf-Urdenbach, Germany, assignors to Henkel & Cie. G.m.b.H., Dusseldorf-Holthausen, Germany
No Drawing. Continuation-in-part of application Ser. No. 427,530, Dec. 29, 1964, which is a continuation-in-part of application Ser. No. 5,130, Jan. 28, 1960. This application Jan. 21, 1966, Ser. No. 523,012
Claims priority, application Germany, Feb. 6, 1959, H 35,571
2 Claims. (Cl. 252—117)

ABSTRACT OF THE DISCLOSURE

Detergent soaps stabilized against rancidity and discoloration by addition of 0.05–2.5 weight percent of a compound of the formula

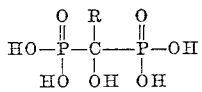

its sodium, potassium, ammonium or ethanolamine salts, wherein R is a saturated aliphatic hydrocarbon having 1 to 11 carbon atoms or phenyl.

---

This application is a continuation-in-part of our copending application Ser. No. 427,530, filed Dec. 29, 1964, now abandoned, which, in turn, had been a continuation-in-part of our application Ser. No. 5,130, filed Jan. 28, 1960, and now abandoned.

The invention relates to surface-active materials and their production and, more particularly, to the increase in the stability of such products.

Surface-active products are used in daily practice for a number of purposes, e.g., for the cleaning of all kinds of surfaces. Such products are, e.g., soaps for cleansing of human and animal bodies and for textiles, laundering agents, detergents and cleansing agents for metals. The surface-active materials are sold in the form of flakes, granules, powders, pastes, and as solutions, with or without additives.

It has been established that surface-active products frequently diminish in their quality and efficiency upon storage, particularly by exposure to light. This is evidenced by rancidity, formation of spots, discoloration and changes in odor.

Attempts have been made at the prevention of these efficiency decreases by the addition of suitable stabilizers and of antioxidants to the surface-active agents. Particularly in the case of soaps, alkali salts of ethylene diamine tetraacetic acid and of nitrilo acetic acid have been proposed as such stabilizers. Alkyl benzene sulfonates tend to become rancid, and it has been suggested to add aryl biguanides and similar compounds thereto to prevent or decrease rancidity. It also has been suggested to use monophosphonic acids for the stabilization of soap. However, none of the compounds named above have met with complete success since it is required that additives comply with a number of conditions in order to be effective.

For instance, the additives must have neither color nor odor and must not react with heavy metals, which frequently are present as traces, under formation of colored compounds. Moreover, the additives must not be volatile nor poisonous and must not react with the surface-active compounds. Also, materials which are decomposed by alkalies cannot be used as additives. The additives must not have a deleterious action on the foaming capabilities of the surface-active products. Furthermore, it is desirable that the additives are effective in small amounts and that they retain their action over a long period of time. Odorants, e.g., perfumes added to soaps, must not be adversely affected by the additives. Finally, especially in the case of toilet soaps which are marketed in fairly large pieces, these must not embrittle under the action of the additives.

It now has been found that the required conditions for stabilization as named above are fulfilled by the addition of compounds having the following Formula 1:

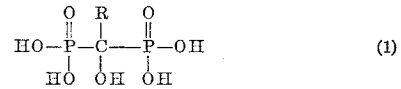

wherein R is an aliphatic hydrocarbon radical having 1 to 11 carbon atoms or a phenyl radical, or by the addition of their salts.

These compounds are produced by the reaction of phosphorous acid with carboxylic acid anhydrides, carboxylic acid chlorides or mixtures of these anhydrides and chlorides in molar proportions of phosphorous acid to acylating agent of 1:1.1–1:1.5 at temperatures ranging from room temperature to substantially 180° C. Suitable carboxylic acid anhydrides and chlorides are those of carboxylic acids having 2 to 12 carbon atoms in their molecules, such as acetic acid, propionic acid, butyric acid, valeric acid, caproic acid, enanthic acid, caprylic acid, pelargonic acid, capric acid, undecylic acid, lauric acid and benzoic acid. The substances can be added to the surface-active materials to be protected in refined or also in crude state. In lieu of the free acids obtained by the acylation, their alkali metal-, ammonium-, mono-, di- and triethanolamine salts can be used, obtained by neutralization with the corresponding bases.

The compounds thus obtained all contain 2 phosphorus atoms and have the Formula 1, wherein one carbon atom less is contained in the radical shown as R than in the carboxylic acid used in the acylation.

The additives according to the invention have no surface-active properties of their own and are incorporated in the surface-active products in solid form or in solution. The surface-active products themselves may be present in solid, molten or dissolved state during the incorporation. The soaps to which the stabilizers named are added are commercial soaps, such as "fine" or toilet soaps, curd soaps, and soft soaps. The term "soap," as is customary, denotes fatty acid sodium, potassium or ammonium salts or mixtures thereof. They may contain such additional ingredients as are commonly used for the purpose of application, such as, e.g., alkalies, phosphates, silicates, glycerides, colorants, odorants and fillers. In order to attain the desired effect, merely small quantities of the additives according to the invention are required, namely 0.05 to 2.5 percent and, preferably, 0.2 to 1 percent.

The invention now will be further illustrated by means of the following examples describing the preparation of a number of storageable soaps and demonstrating the effects. However, it should be understood that these are given merely by way of explanation, not of limitation, and that numerous changes may be made in the details without departing from the spirit and the scope of the invention as hereinafter claimed.

Example 1

In Table 1 the results are listed, obtained with soaps containing the additives named below. The left vertical column names the test conditions. Horizontal columns 1 to 9 give the effects obtained using the same commercial soap in all tests in which the following additives had been incorporated.

Column 1: No additive.
Column 2: 0.25 weight percent of the tetrasodium salt of ethylene diaminotetraacetic acid (this compound frequently is employed for the prevention of the deterioration of the quality of soap).
Column 3: 0.25 weight percent of the disodium salt of 2-hydroxy-2-propanephosphonic acid.
Column 4: 0.25 weight percent of the tetrasodium salt of a compound having Formula 2:

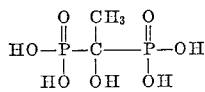  (2)

Column 5: 0.45 weight percent of the di-(triethanolamine) salt of a compound having Formula 3:

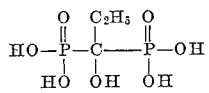  (3)

droxide, carbonate or bicarbonate of the alkali metals, ammonium or the mono-, di- or triethanolamine. The term "neutralization" is to be interpreted in such a manner that the acidic hydrogen is replaced by the corresponding cation totally or in part. The products thus obtained are not neutral since the pH value obtained by the exchange of one hydrogen atom by a cation is between 2 and 3; by the exchange of two hydrogen atoms, the pH is between 5 and 6; by the exchange of three hydrogen atoms the pH is 9 to 10; and when all four hydrogen atoms are replaced, the pH is 11 to 12.

It is to be noted that other organophosphorus compounds, such as 1-one-1-phosphonic acid esters; ethane-1,2-diphosphonic acid; tetraethyl-1-hydroxyethane-1,1-diphosphonic acid esters; tri-o-tolylphosphite; decyldihydrogen phosphate; or stearylaminophenylphosphonic acid esters; have either no stabilizing effect at all or at best an insufficient effect on soap under the conditions of Table 1.

The superiority of the additives according to the invention is not diminished when to the soaps 10 to 50 mg. copper or iron ions are added per kilogram. Without the additives according to the invention, the presence of these heavy metal ions leads to strong discoloration and change in color.

TABLE 1.—TYPE ADDITIVE IN SOAP

| Conditions of Investigation | 1 | 2 | 3 |
|---|---|---|---|
| Not exposed to light. Stored 6 weeks | Single light-yellow spots, fatty odor. | No effect | Single light-yellow spots. |
| In light-exposure box 3 sunny days | Yellow spots, rancid, tacky | Single yellow spots, fatty odor | |
| 10 hours UV radiation | Yellowed, with darker yellow spots, tacky. | No discoloration, fatty odor | |
| 144 hours 60° C. in open vessel | Brown spots | Dirty-ivory color, slightly rancid odor. | Yellowed, rancid odor. |
| 144 hours 60° C. in airtight container | Fewer spots than above, slightly rancid odor. | Light ivory color, no odor change | Yellowed, slightly rancid odor. |

| Conditions of Investigation | 4 | 5 | 6 |
|---|---|---|---|
| Not exposed to light. Stored 6 weeks | No effect | No effect | No effect. |
| In light-exposure box 3 sunny days | Almost no discoloration, fatty odor | | |
| 10 hours UV radiation | Unchanged in color and odor | | |
| 144 hours 60° C. in open vessel | Single ivory discolorations on edges, slightly fatty odor. | Single ivory discolorations on edges, slightly fatty odor. | Single ivory discolorations on edges, slightly fatty odor. |
| 144 hours 60° C. in airtight container | Unchanged in odor and color | Unchanged in odor and color | Unchanged in odor and color. |

| Conditions of Investigation | 7 | 8 | 9 |
|---|---|---|---|
| Not exposed to light. Stored 6 weeks | No effect | No effect | No effect. |
| In light-exposure box 3 sunny days | | | |
| 10 hours UV radiation | | | |
| 144 hours 60° C. in open vessel | Single ivory discolorations on edges, slightly fatty odor. | Single ivory discolorations, slightly fatty odor. | Ivory discoloration, slightly fatty odor. |
| 144 hours 60° C. in airtight container | Unchanged in odor and color | Unchanged in odor and color | Unchanged in odor and color. |

Column 6: 0.6 weight percent of the tetra-(diethanolamine) salt of compound 4:

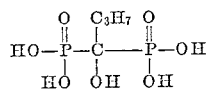  (4)

Column 7: 0.25 weight percent of the diammonium salt of compound 5:

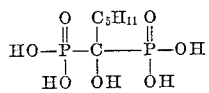  (5)

Column 8: 0.45 weight percent of the tetrapotassium salt of compound 6:

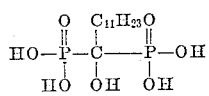  (6)

Column 9: 0.3 weight percent of the trisodium salt of compound 7:

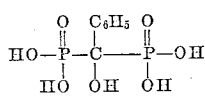  (7)

The results of these tests are the same regardless of whether the free acids or the alkali metal or ethanolamine salts are used. The salts are obtained from the free acids by neutralization with the appropriate quantities of hy- Example 2

For the manufacture of an especially storageable toilet soap, 80 percent fine sodium soap chips are entered in a mixing machine with the usual proportions of superfattening agents, titanium dioxide and perfume. Added thereto are 0.5 percent of the total weight of the tetrasodium salt of a compound having Formula 2. The soap is mixed with these components in the usual manner, is extruded and shaped.

Example 3

For the manufacture of a curd soap in a crutcher, one proceeds as follows: To 3 tons settled sodium soap curd of approximately 0.06 percent free alkali, calculated as NaOH, and 0.3 percent NaCl, 2 percent aqeous solution of the sodium salt of the compound named as Formula 2 are added. The finished soap mixture subsequently is solidified in cooling molds or on cooling plates.

Example 4

A storage-stable soft ammonium soap is obtained by stirring 0.5 percent of the dipotassium salt of Formula 2 compound, dissolved in an equal amount (by weight) water, into the hot, approximately 40 percent soap paste. The soap then is cooled in the usual manner.

Example 5

A storage-stable soft potassium soap is obtained by stirring 0.5 percent of the Formula 2 compound (free acid), dissolved in an equal amount (by weight) water, into the hot, approximately 40 percent soap paste with 0.2 percent free alkali, calculated as KOH. The soap then is cooled in the usual manner.

We claim as our invention:

1. A surface-active material stabilized against rancidity and discoloration consisting of a water-soluble compound selected from the group consisting of sodium-, potassium- and ammonium soaps or mixtures thereof and 0.05 to 2.5 weight percent of a stabilizer selected from the group consisting of a compound of the formula

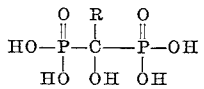

its sodium-, potassium, ammonium-, mono-, di- and triethanolamine salts, wherein R is a saturated aliphatic hydrocarbon having 1 to 11 carbon atoms.

2. A surface-active material stabilized against rancidity and discoloration consisting of a water-soluble compound selected from the group consisting of sodium-, potassium- and ammonium soaps or mixtures thereof and 0.05 to 2.5 weight percent of a stabilizer selected from the group consisting of a compound of the formula

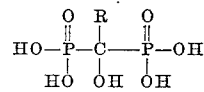

its sodium-, potasium, ammonium-, mono-, di- and triethanolamine salts, wherein R is phenyl.

No references cited.

MURRAY KATZ, *Primary Examiner.*

LEON D. ROSDOL, *Examiner.*

B. BETTIS, *Assistant Examiner.*